No. 636,381. Patented Nov. 7, 1899.
R. B. HAMEL.
FISH CAR.
(Application filed July 19, 1899.)
(No Model.)

WITNESSES:
Geo. B. Rowley.
W. T. Chamberlain

INVENTOR
RICHARD B. HAMEL
BY
Julien T. Davies Jr.
ATTORNEY

UNITED STATES PATENT OFFICE.

RICHARD B. HAMEL, OF BELLPORT, NEW YORK.

FISH-CAR.

SPECIFICATION forming part of Letters Patent No. 636,381, dated November 7, 1899.

Application filed July 19, 1899. Serial No. 724,428. (No model.)

*To all whom it may concern:*

Be it known that I, RICHARD B. HAMEL, a citizen of the United States, residing at Bellport, in the county of Suffolk and State of New York, have invented a new and useful Improvement in Fish-Cars, of which the following is a specification, reference being had to the accompanying drawings, in which—

Figure 1:
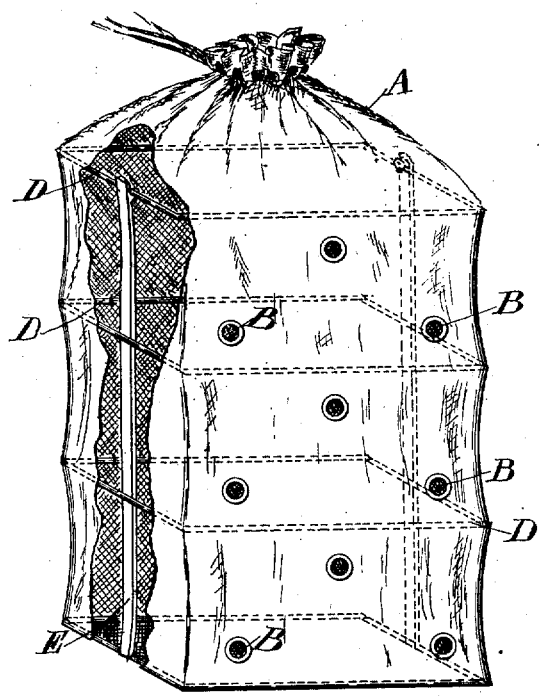
Figure 3:
Figure 2:
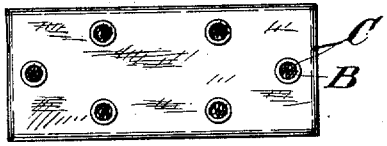

Figure 1 is a perspective view of my new fish-car, a portion of one side being shown broken away to illustrate the interior construction. Fig. 2 is an inverted plan of my fish-car, and Fig. 3 is an elevation of the stretcher.

The object of my invention is to provide a portable fish-car which will permit the fish to be drawn rapidly through the water and at the same time keep the fish alive and in good condition.

Heretofore so far as known to me portable fish-cars have been made of netting, which of course allowed the water to flow freely through it. When one of these cars is secured to a boat and the live fish are placed in the car, the motion of the boat through the water, if the boat is moving at all rapidly, causes the water to rush through the netting of such a car and kills the fish, or, as fishermen express it, the fish are "drowned."

My invention consists in the fish-car hereinafter described and claimed.

In the drawings illustrating the principle of my invention and the best mode now known to me of applying that principle, A is a sack made of canvas or like material, in one or more sides and in the bottom of which are formed apertures B. Rectangular frames D are sewed or otherwise secured to the canvas. The stretcher E is formed with notched ends adapted to fit the frames D and serves to hold the sides of the cage extended when in use.

The advantages of my fish-car over those heretofore used are obvious. No matter how fast the car is drawn through the water the rate of flow of the water within and through the cage will be very moderate. The life of the fish is thereby preserved. At the same time the car permits the flow of water through the apertures, thus insuring a constant fresh supply of water to the fish in the car.

If it is desired to use fewer and larger apertures, the apertures will be covered with screening C.

When the stretcher is removed, the car will collapse, and it may therefore be stowed in a small space.

What I claim is—

1. A fish-car made up of a collapsible envelop of canvas or like material, provided at one end with an opening and formed with apertures in one or more of its walls for the passage of water through the car; said apertures being covered with screens to prevent the escape of the fish therethrough.

2. A fish-car made up of a collapsible envelop of canvas or like material provided at one end with an opening and formed with apertures in one or more of its walls for the passage of water through the car; and extending frames secured within said envelop to hold apart the walls of the car.

3. A fish-car made up of a collapsible envelop of canvas or like material, provided at one end with an opening and formed with apertures in one or more of its walls for the passage of water through the car; extending frames secured within said envelop to hold apart the walls of the car; and a stretcher adapted to engage between the extending frames and hold the walls of the car extended lengthwise.

4. A fish-car made up of a collapsible envelop of canvas or like material provided at one end with an opening and formed with apertures in one or more of its walls for the passage of water through the car, said apertures being screened to prevent the escape of the fish therethrough; and extending frames secured within said envelop to hold apart the walls of the car.

5. A fish-car made up of a collapsible envelop of canvas or like material, provided at one end with an opening and formed with apertures in one or more of its walls for the passage of water through the car, said apertures being covered with screens to prevent the escape of the fish therethrough; extending frames secured within said envelop to hold apart the walls of the car; and a stretcher adapted to engage between the extending frames and hold the walls of the car extended lengthwise.

In testimony whereof I have signed my name to this specification, in the presence of two subscribing witnesses, on this 14th day of July, A. D. 1899.

RICHARD B. HAMEL.

Witnesses:
DANIEL PETTY,
JOHN B. ROBINSON.